United States Patent [19]
Andersen

[11] Patent Number: 5,854,652
[45] Date of Patent: Dec. 29, 1998

[54] LASER PRINTER EMPLOYING MODULATED LASER PROVIDING A UNIFORM GRAY SCALE ACROSS A MEDIA SHEET

[75] Inventor: Eric L. Andersen, Meridian, Id.

[73] Assignee: Hewlett-Packard Company, Palo Alto, Calif.

[21] Appl. No.: 614,794

[22] Filed: Mar. 8, 1996

[51] Int. Cl.[6] .................................................. B41J 2/47
[52] U.S. Cl. ........................ 347/246; 347/252; 347/253
[58] Field of Search .................................. 347/240, 246, 347/247, 251, 252, 253; 358/298

[56] References Cited

U.S. PATENT DOCUMENTS 4,583,128  4/1986  Anderson et al. ..................... 347/246
4,814,791  3/1989  Ohara et al. ........................... 347/253
5,225,850  7/1993  Egawa et al. ......................... 347/246

Primary Examiner—Jeffrey Sterrett

[57] ABSTRACT

A laser printer provides a photoreceptor and a laser which produces an optical beam. A modulator is coupled to the laser and is responsive to binary data values to apply modulation signals to the laser to cause an image-wise modulation of the optical beam. Scan apparatus repetitively scans the optical beam across the photoreceptor to induce an image-wise charge state thereon. The scan apparatus causes, for one of the binary values, a variation in charge states corresponding to the one binary value across the photoreceptor. A function generator applies correction signals to the modulator to alter the optical beam in such a manner as to substantially prevent the variation of charge states. The function generator either causes a modulation of the voltage bias applied to the laser or modulates its pulse width output.

11 Claims, 3 Drawing Sheets

LASER PRINTER EMPLOYING MODULATED LASER PROVIDING A UNIFORM GRAY SCALE ACROSS A MEDIA SHEET

FIELD OF THE INVENTION

This invention relates to laser printers which employ binary dot patterns to represent images and, more particularly, a means and apparatus for modulating the laser in a laser printer to assure a uniform gray level dot pattern across the width of a media sheet.

BACKGROUND OF THE INVENTION

FIG. 1a is a block diagram of a prior art laser printer which employs a binary dot pattern to represent images. A processor 10 feeds to a video controller 12, a raster image of binary values which represent an image to be imprinted on a page. Video controller 12, in response, feeds a series of binary data signals to a laser driver 14 which, in turn, modulates the output of a laser 16 in accordance with the binary data signals. Modulated beam 18 from laser 16 is directed at a rotating, faceted mirror 20 which scans beam 18 across an imaging lens 22. Lens 22 directs scanned beam 18 to a mirror 24 which redirects scanned beam 18 onto a moving organic photoconductor (OPC).

FIG. 1b is a schematic side view of the optics of FIG. 1a, showing rotating faceted mirror 20, lens 22, mirror 24 and a drum 26 on which OPC 28 is positioned. In the known manner, laser beam 18 is scanned across OPC 28 to cause selective discharge thereof in accordance with the modulation of the beam.

Returning to FIG. 1a, at the termination of each scan action, laser beam 18 is incident on a photodetector 30 which outputs a beam detect signal that is used to synchronize the actions of video controller 12 and processor 1 0.

Substantial efforts have been made by manufacturers of laser printers to reduce their cost, while maintaining and improving print quality. Even though laser printers produce images using on/off series of "dots", such printers are now not only utilized to produce text and line drawings, but to produce full gray level images, in both black and white and color configurations. As is known, gray level images are produced by causing only a certain percentage of image dots to be developed (i.e., toned). Theoretically, the gray level, given a constant percentage of dot development across a page, should be uniform.

It has been found that this is not the case. More specifically, and as schematically shown in FIG. 2, it has been determined that with certain widely used imaging systems, the gray level along the edges of the page are darker than the gray level in the center of the page, which evidences a lighter hue. It has been further determined that this variation in gray level is due to the imaging optics and, more particularly, to distortions created by lens 22 and mirror 24 during the scan action of laser beam 18.

FIG. 3 is a plot of the power of optical pulses 30 from laser 16 versus time. Note that each pulse is of uniform intensity (i.e., power). However, as shown in FIG. 4, the relative lens spot intensity of laser beam 18, after it has passed through lens 22 and been reflected by mirror 24, shows considerable variation over a 200 mm media sheet. Note further that there is a significant loss of intensity near the center of the media sheet, leading to smaller discharge levels on an exposed photoconductor, with correspondingly smaller developed dots after toning. Ideally, the relative lens spot intensity in FIG. 4 should be a substantially horizontal line across the chart.

Accordingly, it is an object of this invention to enable a laser printer to produce uniform intensity dots in response to one of two binary levels, across the full width of a media sheet.

It is another object of this invention to provide a laser printer with means for providing uniform intensity toned dots, without requiring a modification of the printer's optical pathway.

It is still another object of this invention to provide a printer with an ability to produce uniform intensity dots across the full width of a media sheet in a manner which takes into account non-linearities in optical components within the printer.

SUMMARY OF THE INVENTION

A laser printer includes a photoreceptor and a laser which produces an optical beam. A modulator is coupled to the laser and is responsive to binary data values to apply modulation signals to the laser to cause an image-wise modulation of the optical beam. Scan apparatus repetitively scans the optical beam across the photoreceptor to induce an image-wise charge state thereon. The scan apparatus causes, for one of the binary values, a variation in charge states corresponding to the one binary value across the photoreceptor. A function generator applies correction signals to the modulator to alter the optical beam in such a manner as to substantially prevent the variation of charge states. The function generator either causes a modulation of the voltage bias applied to the laser or modulates its pulse width output.

DESCRIPTION OF THE DRAWINGS

FIG. 1b is a schematic side view of the optical components of the prior art system of FIG. 1a.

FIG. 3 is a plot of laser beam output pulses for the prior art system of FIG. 1a.

DETAILED DESCRIPTION OF THE INVENTION

Figure 1A:
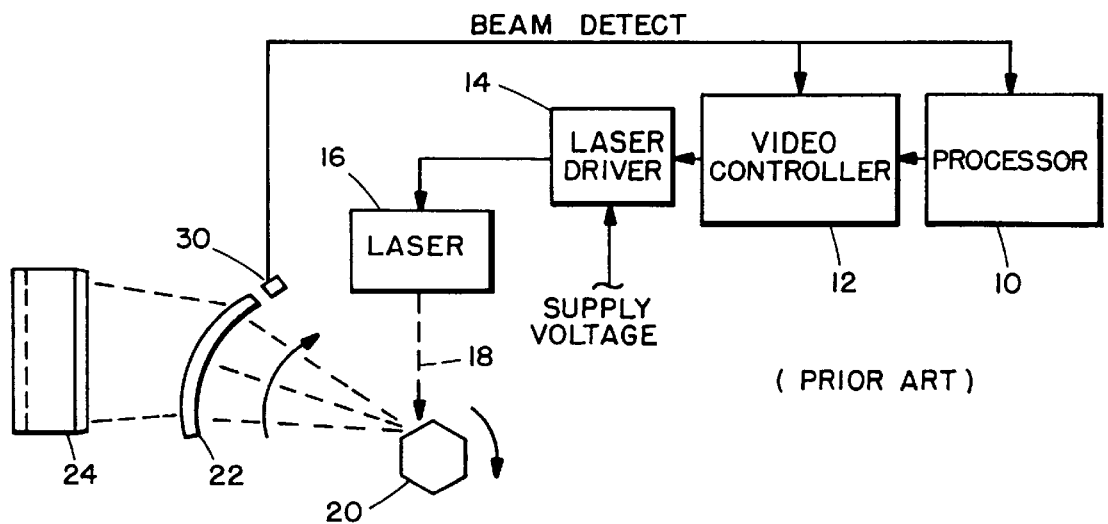
FIG. 1a is a block diagram of a prior art laser printer.
Figure 1B:
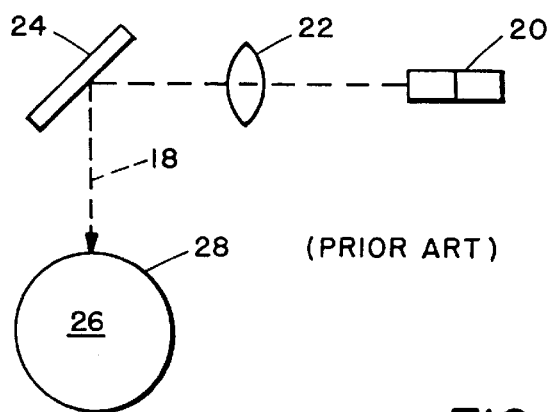
Figure 2:
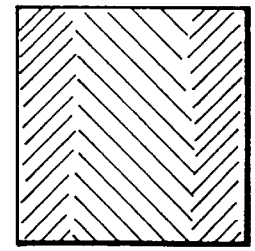
FIG. 2 is a schematic of a media sheet showing gray scale variations across the surface thereof.
Figure 5:
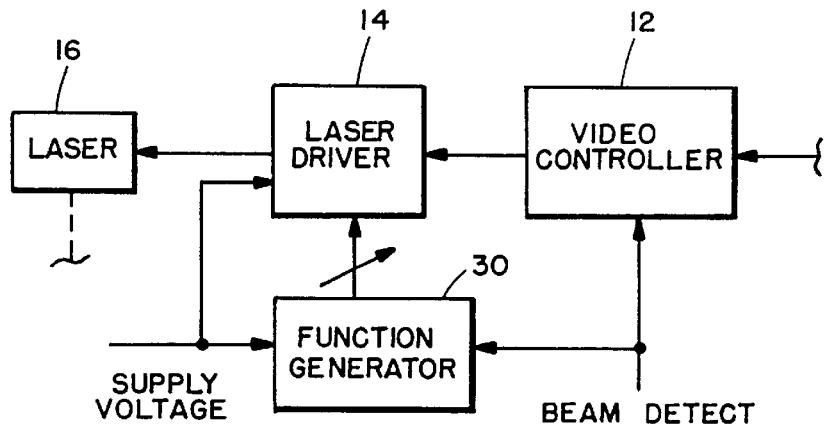
FIG. 5 is a block diagram of electronics for controlling the laser beam in a manner to prevent occurrence of a gray level variation across a photo-receptor.
Figure 3:
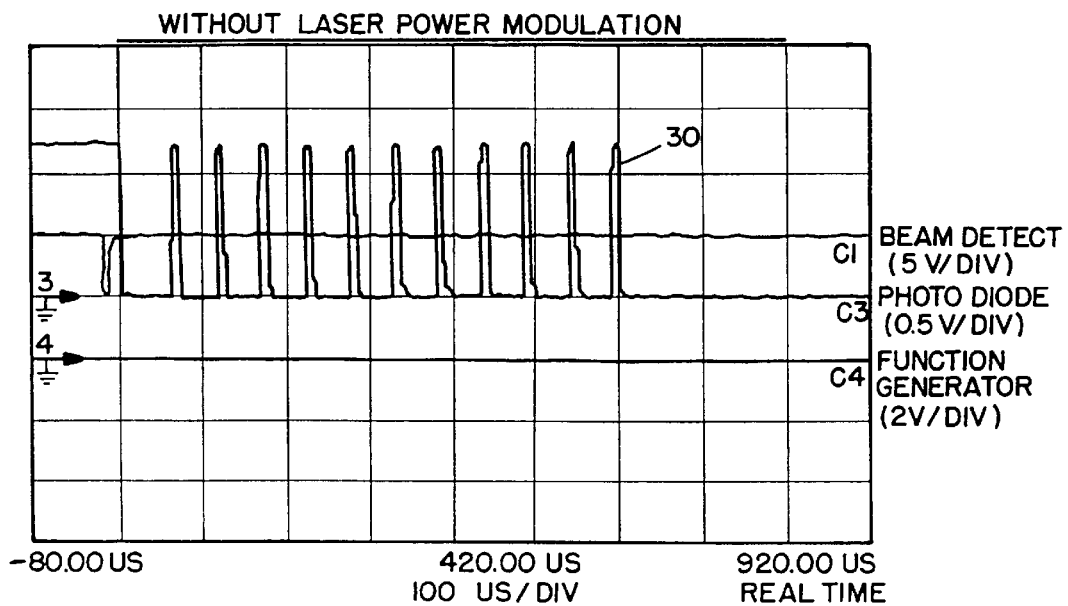
Figure 4:
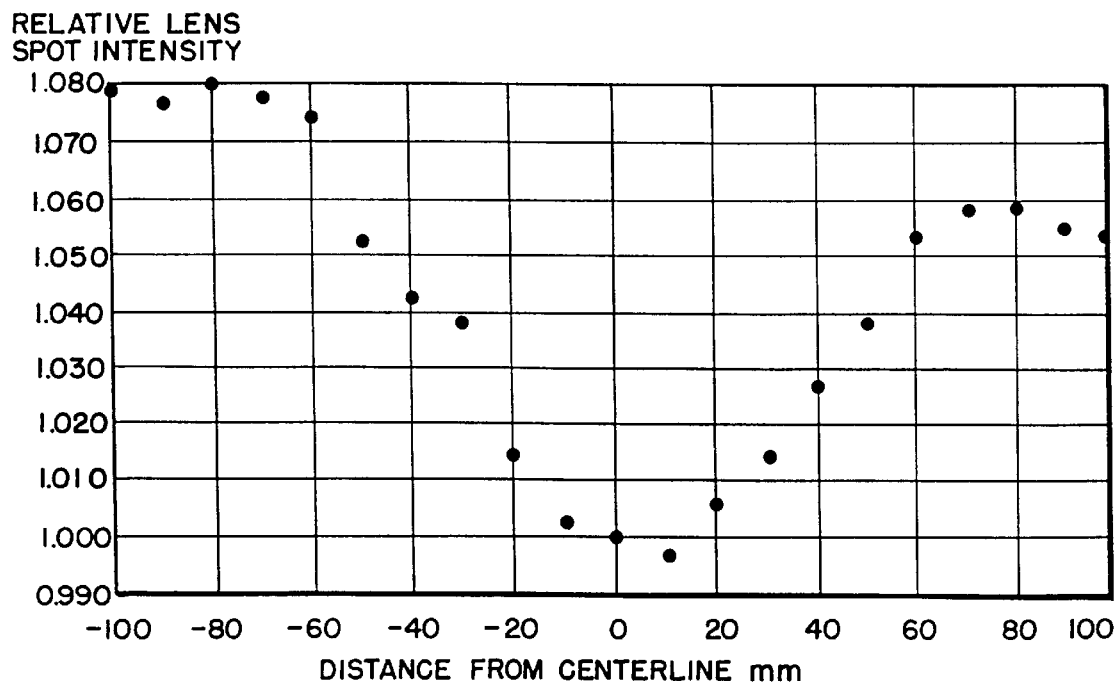
FIG. 4 is a plot of distance from the center line of a photoreceptor vs. relative lens spot intensity during a scan action, using the laser beam pulses of FIG. 3.

Referring to FIG. 5, each of the modules therein which is common to that shown in FIG. 1a is commonly numbered. As described above, laser driver 14 switches laser 16 on and off, based on video signals received from video controller 12. Laser 16 is normally configured as a laser diode and responds to input pulses from laser driver 14 by generating constant intensity output optical pulses. As further indicated above, it is non-linearities present in the optical system comprising lens 22 and mirror 24 which create a non-linear gray level printing on a media sheet. More specifically, dots corresponding to a "one" binary level (for instance) are not of constant size across the entire width of the media sheet, thus giving rise to a gray level variation.

Since the dot size non-linearity is constant from scan to scan, it has been determined that the non-linearity during each scan can be compensated by controlling laser driver 14 to output varying magnitude drive pulses which, in turn, induce a variation in intensity (i.e., power) of output optical beam 18. To accomplish such a correction, a function generator 30 is connected to laser driver 14 and modulates the output power of excitation pulses that are applied to laser 16.

A supply voltage is applied to both function generator 30 and laser driver 14. The control output from function generator 30 preferably modulates the supply voltage within laser driver 14 to enable a concomitant variation of the excitation pulses that are output by laser driver 14 to laser 16. The timing of the control voltage output from function generator 30 is controlled by the beam detect signal, which also synchronizes the operation of video controller 12.

Figure 6:
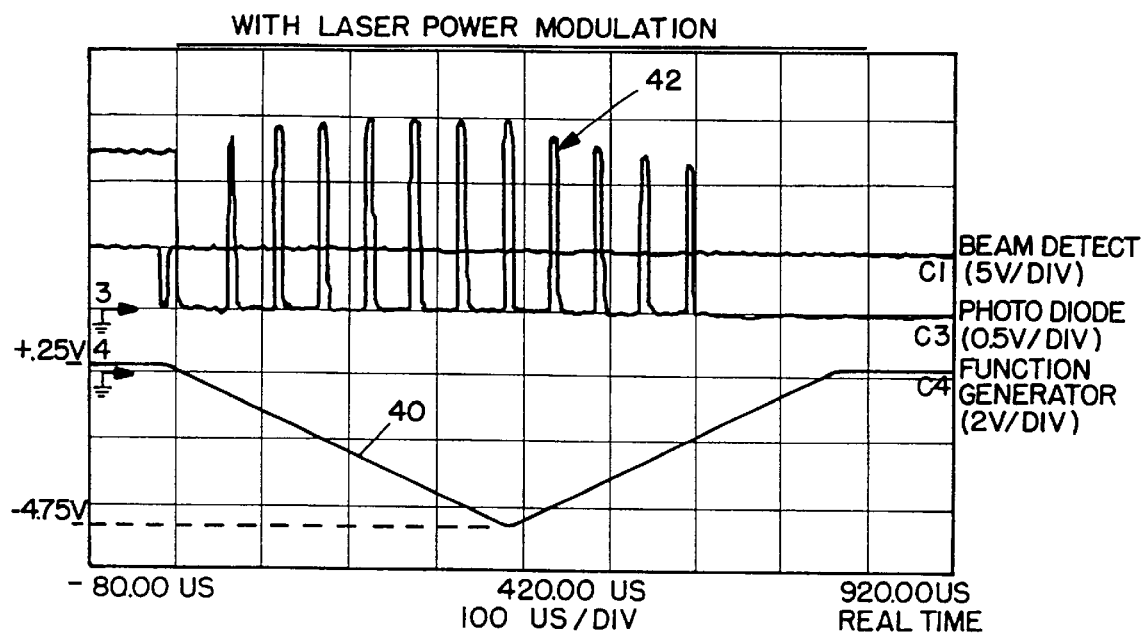
FIG. 6 is a plot showing a variation in output laser pulses, in response to a control signal output from a function generator.

Referring to FIG. 6, function generator 30 is responsive to a beam detect pulse to output an inverted triangular wave form 40 which, within laser driver 14, is applied to a voltage supply control circuit (not shown) whose conduction state controls the supply voltage. Thus, as waveform 40 becomes more negative, conduction within the voltage supply control circuit (e.g. including a MOSFET) decreases, thereby causing the supply potential to rise to a higher level. Conversely, as waveform 40 becomes more positive, conduction of the MOSFET increases and causes a decrease in the supply potential. As a result, the output pulses from laser driver 14 are caused to vary in accordance with changes in the supply voltage. Laser 16 accordingly produces optical pulses 47 (in FIG. 7) whose magnitudes vary in approximate conformance with waveform 40.

Figure 7:
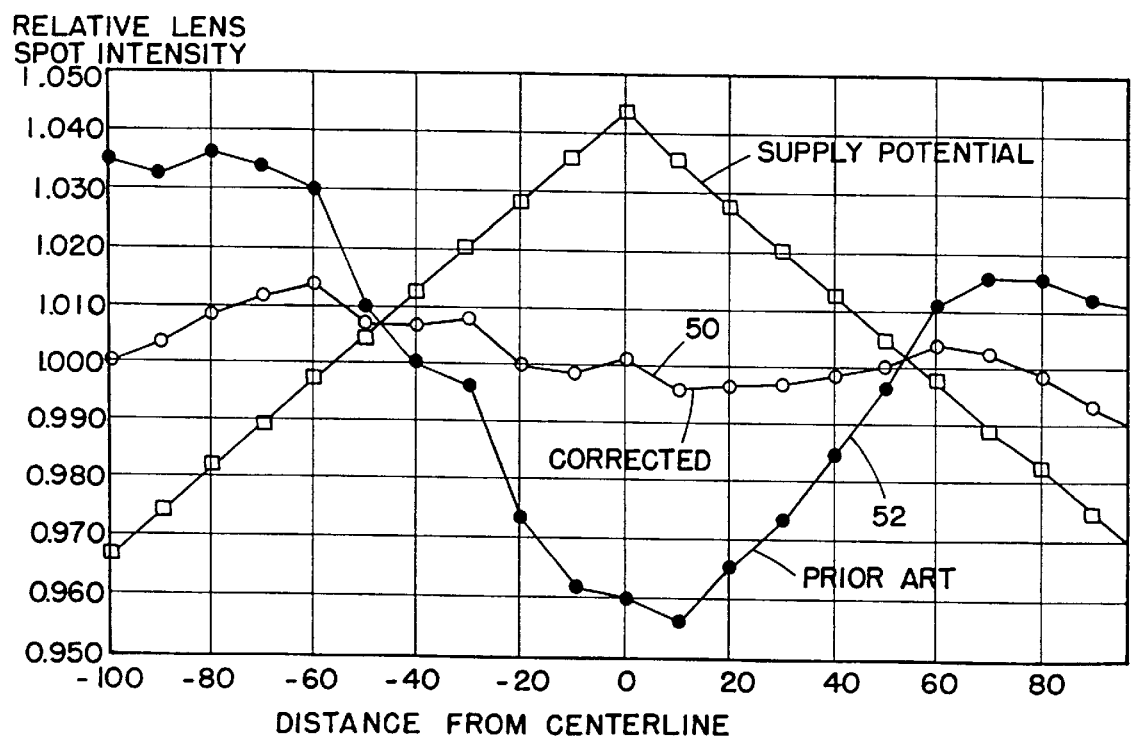
FIG. 7 is a plot of distance from the center line of a photoreceptor vs. relative lens spot intensity, showing the effect of the invention.

In FIG. 7, change in supply potential is plotted against distance from center line of a photoreceptor to indicate how, during a scan, the supply potential is varied by application of the control output from function generator 30. As a result, the lens spot intensity, which is the normalized power of pulses from laser 16, is altered in such a manner such that the effect of the non-linear optics of the system are countered and a corrected spot intensity 50 results. For comparison, plot 52 is the relative lens spot intensity achieved by the prior art system of FIG. 1a.

It can thus be seen that the provision of modulation means for altering the power output of laser 16 enables non-linearities present in the optical system to be corrected. Therefore, no changes to the physical mechanisms of the printer are required, except for the addition of a function generator 30 or its equivalent.

While function generator 30 has been described as generating a triangular output waveform, any shape waveform which conforms to the complement of the optical distortions can be output. Further, while a function generator (such as a 33120A function generator available from the Assignee hereof) is preferred, any other circuit which can be synchronized to output a counter-acting waveform to laser driver 14 is acceptable. Further, while the invention has been described in the context of alteration of the power output of laser driver 14 to achieve changed intensity optical pulses from laser 16, the duration of the output pulses of laser 16 can also be similarly adjusted to achieve the same correcting action.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Electrophotographic apparatus comprising:

photoreceptor;

laser means for producing an optical beam;

modulation means coupled to said laser means and responsive to binary data values, for applying modulation signals to said laser means to cause an image-wise modulation of said optical beam;

scan means, including focusing optics, for repetitively scanning said optical beam through said focusing optics and onto said photoreceptor to induce an image-wise charge state thereon, said scan means and focusing optics causing, for one of said binary values, a variation of charge state corresponding to said one of said charge states, across said photoreceptor; and function means for applying fixed correction signals to said modulation means during each scan to alter said optical beam in a manner to substantially prevent said variation of charge state induced by said scan means and focusing optics, said fixed correction signals being unchangeable from scan to scan.

2. The electrophotographic apparatus as recited in claim 1, further comprising:

beam detect means for detecting said optical beam at a scan position thereof and for deriving and applying beam detect signals to said function means to synchronize said correction signals with operation of said scan means.

3. The electrophotographic apparatus as recited in claim 2, wherein said variation of charge state is a repetitive function on each scan, and wherein said correction signals manifest a substantially complementary signal pattern to said variation of charge state so as to correct therefor.

4. The electrophotographic apparatus as recited in claim 3, wherein said variation of charge state is a repetitive function on each scan which manifests a generally triangular shape.

5. The electrophotographic apparatus as recited in claim 3, wherein said correction signals modulate a voltage bias applied to said laser means.

6. The electrophotographic apparatus as recited in claim 3, wherein said correction signals modulate a pulse width output of said laser means.

7. A method for controlling an electrophotographic apparatus to produce across a photoreceptor, consistent charge states corresponding to a binary data value, said apparatus including said photoreceptor, a laser means for producing an optical beam, modulation means, and scan means, including focusing optics, for repetitively scanning said optical beam across said photoreceptor to induce an image-wise charge state thereon, said scan means and focusing optics causing, for one of said binary values, a variation of charge state corresponding to said one of said charge states, across said photoreceptor, said method comprising:

applying modulation signals from said modulation means to said laser means to cause an image-wise modulation of said optical beam during each scan thereof; and applying fixed correction signals to said modulation means to alter said optical beam in a manner to substantially prevent said variation of charge state that is induced by said scan means and focusing optics, said fixed correction signals being unchangeable from scan to scan.

8. The method as recited in claim 7, further comprising the steps of:

detecting said optical beam at a scan position thereof to derive detect signals;

applying said detect signals to synchronize said correction signals with operation of said scan means.

9. The method as recited in claim 7, further comprising the charge state is a repetitive function on each scan, and wherein said applying step applies correction signals which manifest a substantially complementary signal pattern to said variation of charge state so as to correct therefor.

10. The method as recited in claim 7, wherein said applying step causes said correction signals to modulate a voltage bias applied to said laser means.

11. The electrophotographic apparatus as recited in claim 7, wherein said applying step causes said correction signals to modulate a pulse width output of said laser means.

* * * * *